(12) United States Patent
Kii

(10) Patent No.: US 8,704,781 B2
(45) Date of Patent: Apr. 22, 2014

(54) INFORMATION PROCESSING APPARATUS, INFORMATION PROCESSING METHOD, AND PROGRAM

(75) Inventor: Manabu Kii, Tokyo (JP)

(73) Assignee: Sony Corporation, Tokyo (JP)

( * ) Notice: Subject to any disclaimer, the term of this patent is extended or adjusted under 35 U.S.C. 154(b) by 984 days.

(21) Appl. No.: 12/708,099

(22) Filed: Feb. 18, 2010

(65) Prior Publication Data
US 2010/0259494 A1 Oct. 14, 2010

(30) Foreign Application Priority Data
Apr. 14, 2009 (JP) ................................. 2009-097722

(51) Int. Cl.
*G06F 3/041* (2006.01)

(52) U.S. Cl.
USPC ..... 345/173; 345/156; 178/18.06; 178/18.03; 715/769

(58) Field of Classification Search
USPC .................... 345/156, 173; 178/18.01–19.04; 715/769, 863, 864
See application file for complete search history.

(56) References Cited

U.S. PATENT DOCUMENTS

| 6,252,563 | B1 * | 6/2001 | Tada et al. ........................ 345/1.1 |
| 6,331,840 | B1 * | 12/2001 | Nielson et al. .................. 345/1.1 |
| 6,545,669 | B1 * | 4/2003 | Kinawi et al. .................. 345/173 |
| 7,573,462 | B2 * | 8/2009 | Ouchi ............................. 345/157 |
| 8,194,043 | B2 * | 6/2012 | Cheon et al. ................... 345/173 |
| 2004/0049743 | A1 * | 3/2004 | Bogward ....................... 715/531 |
| 2005/0093868 | A1 * | 5/2005 | Hinckley ....................... 345/502 |
| 2005/0270278 | A1 * | 12/2005 | Ouchi ............................ 345/173 |
| 2007/0085759 | A1 * | 4/2007 | Lee et al. ...................... 345/1.1 |
| 2007/0242771 | A1 | 10/2007 | Kondo |
| 2009/0322689 | A1 * | 12/2009 | Kwong et al. ................. 345/173 |
| 2010/0188352 | A1 * | 7/2010 | Ikeda ............................ 345/173 |
| 2010/0225601 | A1 * | 9/2010 | Homma et al. ................ 345/173 |
| 2011/0018821 | A1 * | 1/2011 | Kii ................................ 345/173 |

FOREIGN PATENT DOCUMENTS

| EP | 2241962 A2 * | 10/2010 | ............. G06F 3/048 |
| JP | 5-143503 A | 6/1993 | |
| JP | 6-44001 | 2/1994 | |
| JP | 9-311757 | 12/1997 | |

(Continued)

OTHER PUBLICATIONS

U.S. Appl. No. 61/095,225.*
U.S. Appl. No. 12/754,832, filed Apr. 6, 2010, Kii.

(Continued)

*Primary Examiner* — Lun-Yi Lao
*Assistant Examiner* — Priyank Shah
(74) *Attorney, Agent, or Firm* — Oblon, Spivak, McClelland, Maier & Neustadt, L.L.P.

(57) ABSTRACT

An information processing apparatus includes a first touch panel, a second touch panel, a touch sensor, and a controller. The first touch panel displays an object and detects a first touch operation of a user on the object. The second touch panel detects a second touch operation of the user. The touch sensor is provided between the first touch panel and the second touch panel and detects a third touch operation of the user. The controller moves the object displayed on the first touch panel in accordance with the first touch operation, and displays the object on the second touch panel when the third touch operation is detected within a first time period since the first touch operation has become undetected and the second touch operation is detected within a second time period since the third touch operation is detected.

10 Claims, 10 Drawing Sheets

(56) References Cited

FOREIGN PATENT DOCUMENTS

| | | |
|---|---|---|
| JP | 2003-150273 | 5/2003 |
| JP | 2005-346583 A | 12/2005 |
| JP | 2007-193589 | 8/2007 |

OTHER PUBLICATIONS

Office Action issued May 28, 2013 in Japanese Patent Application No. 2009-097722.

European Search Report for Application No. EP10002586.5, dated Jan. 27, 2014.

\* cited by examiner

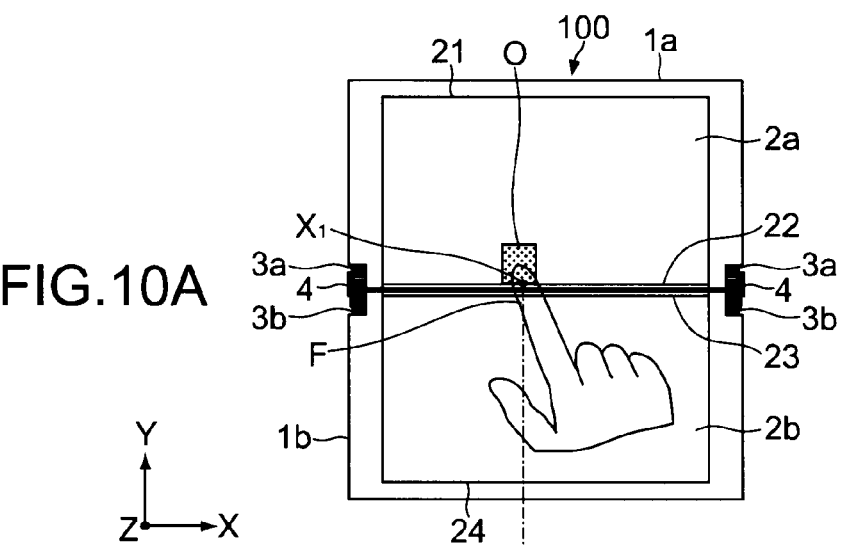
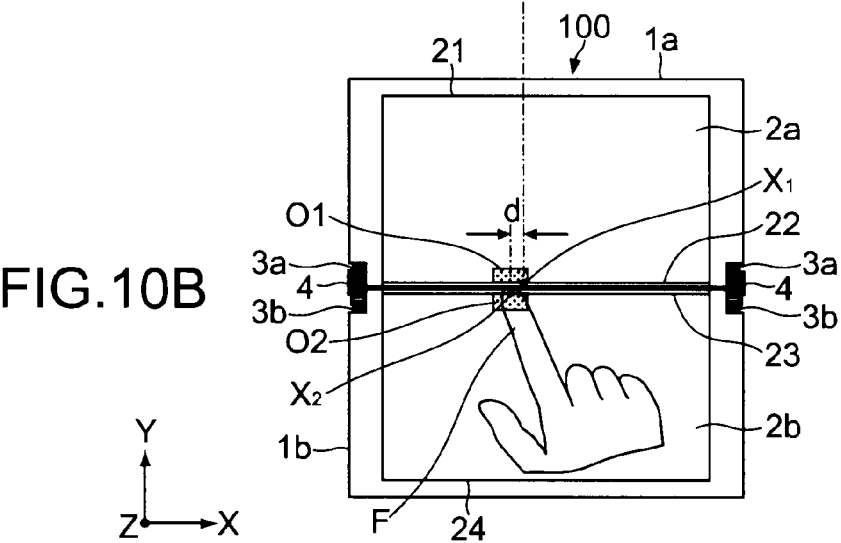
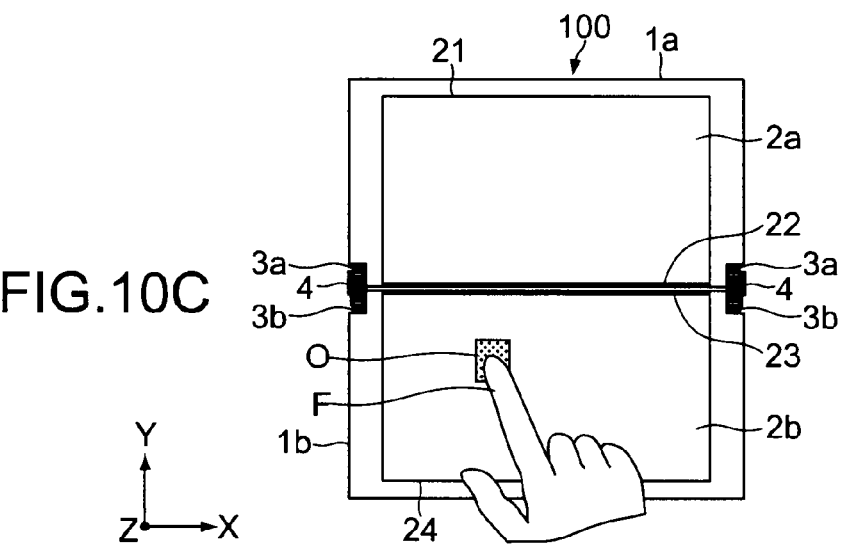

INFORMATION PROCESSING APPARATUS, INFORMATION PROCESSING METHOD, AND PROGRAM

BACKGROUND OF THE INVENTION

1. Field of the Invention

The present invention relates to an information processing apparatus including a plurality of touch panels, an information processing method for the information processing apparatus, and a program therefor.

2. Description of the Related Art

From the past, information processing apparatuses that each include a plurality of touch panels are known.

For example, Japanese Patent Application Laid-open No. 2003-150273 (FIGS. 1, 4, 10, etc.; hereinafter, referred to as Patent Document 1) discloses a watch-type PDA (Personal Digital Assistant) in which a plurality of panels including LCDs (Liquid Crystal Displays) integrally formed with a plurality of touch panels are connected by a hinge portion.

SUMMARY OF THE INVENTION

However, in the PDA disclosed in Patent Document 1, only an operation to a button displayed on each LCD is detected by the touch panel, and the PDA does not support an operation of moving an object by a touch operation. Least of all, the PDA is incapable of detecting a series of touch operations to the plurality of touch panels to cause the object to be drag-and-dropped across the plurality of touch panels.

In view of the circumstances as described above, there is a need for an information processing apparatus, an information processing method, and a program therefor that are capable of executing a drag-and-drop operation of an object by positively detecting a series of touch operations across a plurality of touch panels.

According to an embodiment of the present invention, there is provided an information processing apparatus including a first touch panel, a second touch panel, a touch sensor, and a controller. The first touch panel displays an object and detects a first touch operation of a user on the object. The second touch panel detects a second touch operation of the user. The touch sensor is provided between the first touch panel and the second touch panel and detects a third touch operation of the user. The controller moves the object displayed on the first touch panel in accordance with the first touch operation. Then, the controller displays the object on the second touch panel when the third touch operation is detected within a first time period since the first touch operation has become undetected and the second touch operation is detected within a second time period since the third touch operation is detected.

With this structure, the information processing apparatus can execute a drag-and-drop operation across the first touch panel and the second touch panel by recognizing the second touch operation detected within a predetermined time period since the end of the first touch operation as a series of touch operations. Moreover, since the touch sensor is provided, the information processing apparatus is also capable of positively detecting the drag-and-drop operation and preventing an unintentional operation from being made.

Here, the first and second touch panels include those that include a non-contact-type capacitance sensor, and the first and second touch operations include those that are not accompanied by a physical contact with respect to the first and second touch panels. Moreover, the object includes an icon, a window, and various other images.

The controller may display, near the touch sensor, when the third touch operation is detected, an image indicating that the object is to be moved to the second touch panel.

Here, the "image indicating that the object is to be moved" may indirectly indicate the movement by, when the second touch panel is seen as a water surface, for example, an animation such as a ripple or ruffle of the water surface. Alternatively, the image may directly indicate the movement with a part of an object, letters indicating the movement, and the like.

Accordingly, the user can positively grasp that a drag operation of the object is to be executed across the two touch panels.

The first touch panel may include a first touch surface having a first end side and a second end side opposed to the first end side. The second touch panel may include a second touch surface having a third end side adjacent to the second end side with the touch sensor interposed therebetween and a fourth end side opposed to the third end side. In this case, the controller may display, when the third touch operation is detected, the object such that a part of the object sticks out from the third end side of the second touch panel from the touch sensor side.

With this structure, by displaying a part of the object on the second touch panel at a time of the drag operation, the user can more-positively grasp that the drag operation to the second touch panel is being executed.

The first touch panel may include a first touch surface to which the first touch operation is input, the second touch panel may include a second touch surface to which the second touch operation is input, and the touch sensor may include a third touch surface to which the third touch operation is input. In this case, the first touch surface, the second touch surface, and the third touch surface may be provided so that the first touch surface, the second touch surface, and the third touch surface are positioned on the same plane at a time the first touch operation, the second touch operation, and the third touch operation are input.

With this structure, the user can intuitionally perform a drag-and-drop operation from the first touch panel to the second touch panel via the touch sensor without being conscious of the panels and the touch sensor.

The controller may detect a time period from a time the first touch operation is detected to a time the second touch operation is detected. Further, the controller may display, when the time period is a predetermined value or less, the object on the second touch panel irrespective of whether the third touch operation has been detected.

With this structure, the information processing apparatus can move, when the drag operation has momentum, that is, when a movement velocity of a finger, a touch pen, and the like is high, the object to the second touch panel and display it thereon irrespective of whether the third touch operation has been detected. Therefore, even when the third touch operation is not detected although a drag-and-drop operation has been made, the information processing apparatus can positively execute the drag-and-drop operation.

According to another embodiment of the present invention, there is provided an information processing apparatus including a first touch panel, a second touch panel, and a controller. The first touch panel displays an object and detects a first touch operation of a user on the object. The second touch panel is provided adjacent to the first touch panel in a first direction and detects a second touch operation of the user. The controller moves the object displayed on the first touch panel in accordance with the first touch operation and stores a first detection coordinate in a second direction orthogonal to the first direction, that is obtained at a time the first touch operation has become undetected. Further, the controller displays the object on the second touch panel when the second touch operation is detected within a predetermined time period since the first touch operation has become undetected and a second detection coordinate in the second direction obtained at the time the second touch operation is detected is within a predetermined range from the first detection coordinate.

With this structure, when the first detection coordinate and the second detection coordinate are within the predetermined range, that is, are close to each other, the information processing apparatus can move the object assuming that a drag-and-drop operation has been made from the first touch panel to the second touch panel. Therefore, the information processing apparatus can prevent the object from being moved unintentionally when merely the first touch operation and the second touch operation are detected successively.

Moreover, in this case, the first touch panel may include a first touch surface having a first end side and a second end side opposed to the first end side. The second touch panel may include a second touch surface having a third end side adjacent to the second end side and a fourth end side opposed to the third end side. In this case, the controller may display, when the second detection coordinate in the second direction is within the predetermined range from the first detection coordinate, the object such that a part of the object sticks out from the third end side of the second touch panel.

With this structure, by displaying a part of the object on the second touch panel at the time of the drag operation, the user can more-positively grasp that the drag operation to the second touch panel is being executed.

According to another embodiment of the present invention, there is provided an information processing method including displaying, by a first touch panel, an object and detecting a first touch operation of a user on the object, and detecting, by a second touch panel, a second touch operation of the user. The information processing method also includes detecting, by a touch sensor that is provided between the first touch panel and the second touch panel, a third touch operation of the user. The object displayed on the first touch panel is moved in accordance with the first touch operation, and the object is displayed on the second touch panel when the third touch operation is detected within a first time period since the first touch operation has become undetected and the second touch operation is detected within a second time period since the third touch operation is detected.

By this method, the first touch operation to the first touch panel, the third touch operation to the touch sensor, and the second touch operation to the second touch panel can be recognized as a series of touch operations, and a drag-and-drop operation across the first and second touch panels is thus executed.

According to another embodiment of the present invention, there is provided a program causing an information processing apparatus including a first touch panel, a second touch panel, and a touch sensor provided between the first touch panel and the second touch panel to execute a first detection step, a second detection step, a third detection step, and a control step. The first detection step includes displaying, by the first touch panel, an object and detecting a first touch operation of a user on the object. The second detection step includes detecting, by the second touch panel, a second touch operation of the user. The third detection step includes detecting, by the touch sensor, a third touch operation of the user. The control step includes moving the object displayed on the first touch panel in accordance with the first touch operation. The control step also includes displaying the object on the second touch panel when the third touch operation is detected within a first time period since the first touch operation has become undetected and the second touch operation is detected within a second time period since the third touch operation is detected.

By this program, the first touch operation to the first touch panel, the third touch operation to the touch sensor, and the second touch operation to the second touch panel can be recognized as a series of touch operations, and a drag-and-drop operation across the first and second touch panels is thus executed.

As described above, according to the embodiments of the present invention, a drag-and-drop operation of an object can be executed by positively detecting a series of touch operations across a plurality of touch panels.

These and other objects, features and advantages of the present invention will become more apparent in light of the following detailed description of best mode embodiments thereof, as illustrated in the accompanying drawings.

BRIEF DESCRIPTION OF DRAWINGS

FIG. 10 are diagrams showing an example of a state of the drag-and-drop operation by the portable information apparatus according to the second embodiment of the present invention seen from a direction of a plane of a touch panel.

DESCRIPTION OF PREFERRED EMBODIMENTS

Figure 1:
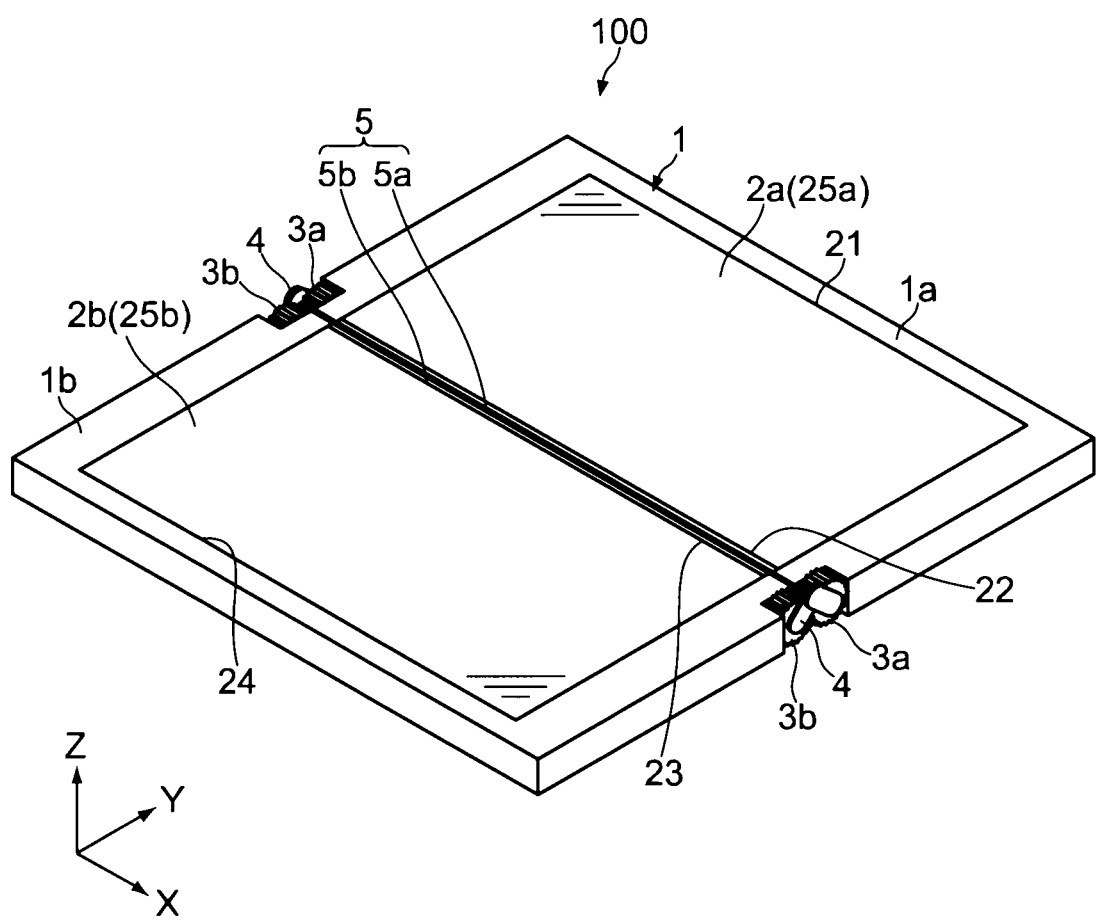
FIG. 1 is a diagram showing an outer appearance of a portable information apparatus according to a first embodiment of the present invention.

Hereinafter, embodiments of the present invention will be described with reference to the drawings.
<First Embodiment>
First, a first embodiment of the present invention will be described.
(General Outline of Portable Information Apparatus)
FIG. 1 is a diagram showing an outer appearance of a portable information apparatus according to the first embodiment of the present invention.

As shown in the figure, a portable information apparatus 100 includes a so-called clamshell-type casing 1 in which two casings 1a and 1b are connected rotatably (in openable state). FIG. 1 shows a state where the casings 1a and 1b are opened. A user operates the portable information apparatus 100 in this state.

The casings 1a and 1b include touch panels 2a and 2b, respectively, on surfaces thereof that are exposed in the opened state. The touch panels 2a and 2b are provided integrally with displays 25a and 25b, respectively. The touch panel 2a includes a touch surface having an end side 21 and an end side 22 opposed to the end side 21. Similarly, the touch panel 2b includes a touch surface having an end side 23 and an end side 24 opposed to the end side 23. The touch panels 2a and 2b detect touch operations made by a finger of a user on an object displayed on the displays 25a and 25b. Examples of the touch operation include, in addition to a drag-and-drop operation to be described later in detail, a click (simple touch) operation, a scroll operation, and a flick operation.

The casing 1a includes gear members 3a on both side surfaces on the end side 22 side, and the casing 1b includes gear members 3b on both side surfaces on the end side 23 side. The gear members 3a and the gear members 3b are connected in an intermeshed state by coupling members 4. The coupling members 4 are each structured such that ends of two plates (or bars) are connected rotatably, and the other ends of the two plates (or bars) are connected to rotary axes of the gear members 3a and 3b. By the gear members 3a and 3b and the coupling members 4, the casings 1a and 1b are connected rotatably. With such a structure, a distance between the touch panel 2a of the casing 1a and the touch panel 2b of the casing 1b can be brought closer to each other than in a case where the casings 1a and 1b are connected using, for example, a hinge.

A touch sensor 5 is provided between the end side 22 of the touch panel 2a and the end side 23 of the touch panel 2b. The touch sensor 5 includes a touch sensor portion 5a that is provided continuously on the casing 1a from the end side 22 of the touch panel 2a and a touch sensor portion 5b that is provided continuously on the casing 1b from the end side 23 of the touch panel 2b. The touch surface of the touch panel 2a, the touch surface of the touch panel 2b, and the touch sensor 5 are provided so as to be positioned on the same plane when the casings 1a and 1b are in the opened state.

(Hardware Structure of Portable Information Apparatus)

Figure 2:
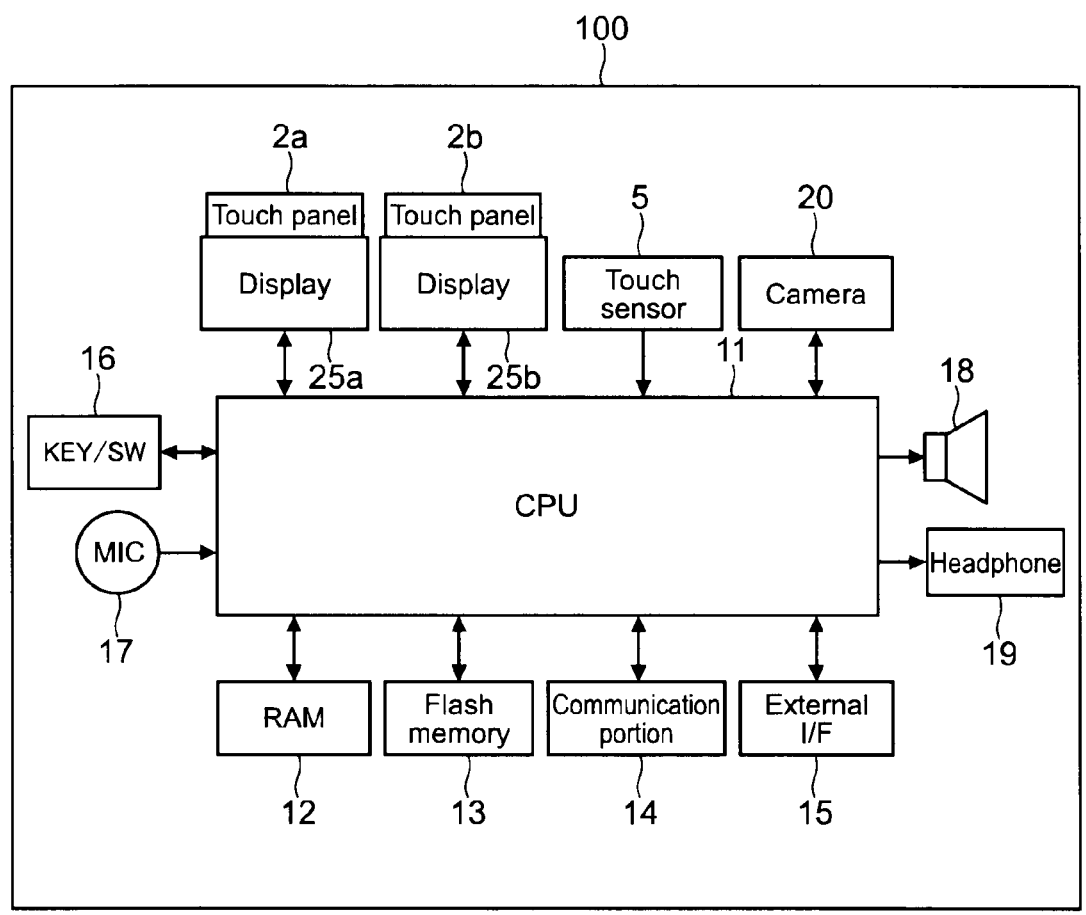
FIG. 2 is a diagram showing a hardware structure of the portable information apparatus according to the first embodiment of the present invention.

FIG. 2 is a diagram showing a hardware structure of the portable information apparatus 100.

As shown in the figure, the portable information apparatus 100 includes, in addition to the touch panels 2a and 2b (displays 25a and 25b) and the touch sensor 5, a CPU (Central Processing Unit) 11, a RAM (Random Access Memory) 12, and a flash memory 13. The portable information apparatus 100 also includes a communication portion 14, an external I/F (Interface) 15, a key/switch portion 16, a microphone 17, a speaker 18, a headphone 19, and a camera 20.

The CPU 11 exchanges signals with the respective portions of the portable information apparatus 100 to perform various operations and collectively controls various types of display processing and other processing that correspond to touch operations made to the touch panels 2a and 2b.

The RAM 12 is used as a working area of the CPU 11 and temporarily stores various types of data including images such as various icons to be processed by the CPU 11 and programs such as an application for executing the various types of display processing corresponding to the touch operations to the touch panels 2a and 2b.

The flash memory 13 is of a NAND type, for example. The flash memory 13 stores various types of data including images such as various icons described above and various programs such as a control program to be executed by the CPU 11 and an application for executing the various types of display processing. The application may be stored in other recording media such as a memory card (not shown). The portable information apparatus 100 may include an HDD in place of or in addition to the flash memory 13.

The communication portion 14 is an interface for connecting the portable information apparatus 100 to the Internet or a LAN (Local Area Network) according to a standard of the Ethernet (registered trademark), a wireless LAN, or the like.

The external I/F 15 exchanges various types of data via wired or wireless connection with an external apparatus based on various standards of a USB (Universal Serial Bus), a wireless LAN, and the like. The external I/F 15 may alternatively be an interface for connecting to various memory cards such as a memory stick.

The key/switch portion 16 accepts operations corresponding to functions equivalent to functions that cannot be executed by an operation to the touch panels 2a and 2b, such as ON/OFF of a power source (not shown) and a switch of various functions, and functions that can be executed by an operation to the touch panels 2a and 2b, and transmits input signals to the CPU 11.

The microphone 17 inputs audio such as a user voice for verbal communication in a case where the portable information apparatus 100 is connected to other apparatuses on a network by the communication portion 14.

The speaker 18 and the headphone 19 output audio signals that are stored in the flash memory 13 or the like or input from the communication portion 14 or the microphone 17.

The camera 20 captures a still image and a moving image by an image pickup device such as a CMOS (Complementary Metal Oxide Semiconductor) sensor and a CCD (Charge Coupled Device) sensor. The captured data is stored in the RAM 12 or the flash memory 13 or transmitted to other apparatuses on the network via the communication portion 14.

Although a resistance film system or a capacitance system is used as an operation system of the touch panels 2a and 2b and the touch sensor 5, other systems such as an electromagnetic induction system, a matrix switch system, a surface elastic wave system, and an infrared-ray system may be used instead. When the capacitance system is used as the operation system, the "touch operation" in this embodiment includes not only a case where a finger of a user is physically in contact with the touch panels 2a and 2b and the touch sensor 5, but also a case where the finger of the user is brought close enough within a range in which a change in a capacitance can be detected.

Though not shown, the portable information apparatus 100 also includes a cable and a flexible substrate for an electrical connection between the touch panels 2a and 2b. The cable and the flexible substrate may be provided across the gear members 3a and 3b and the coupling members 4.

The displays 25a and 25b are, for example, an LCD of a TFT or the like or an OELD (Organic Electro-Luminescence Display) and display GUIs for touch operations such as an icon and a window and other images. The displays 25a and 25b are integrally formed with the touch panels 2a and 2b as described above.

(Operation of Portable Information Apparatus)

Next, an operation of the portable information apparatus 100 structured as described above will be described.

(Opening and Closing Operation of Portable Information Apparatus)

First, an opening and closing operation of the portable information apparatus 100 will be described. FIG. 3 are diagrams showing opening and closing states of the portable information apparatus 100.

Figure 3A:
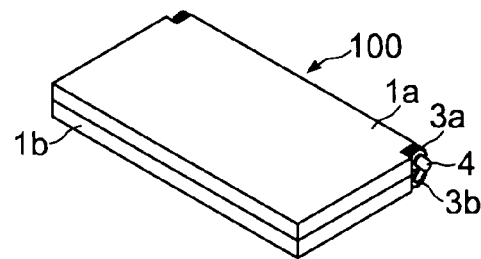
FIG. 3 are diagrams showing opening and closing states of the portable information apparatus according to the first embodiment of the present invention.
Figure 3B:
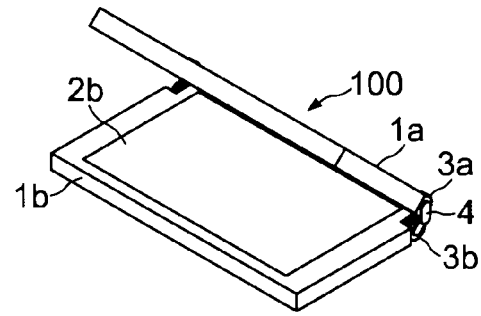
Figure 3C:
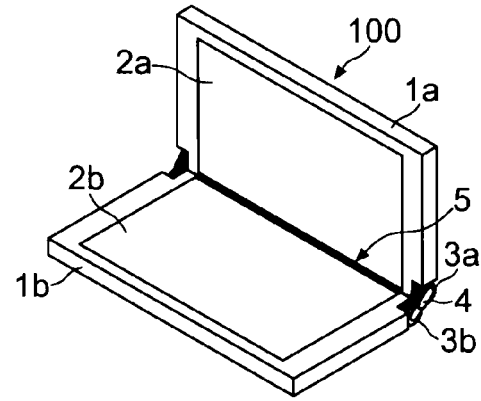
Figure 3D:
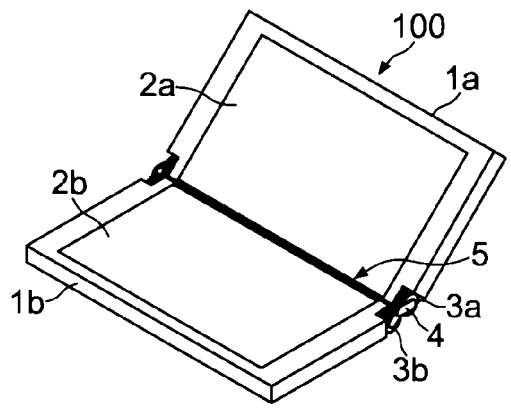
Figure 3E:
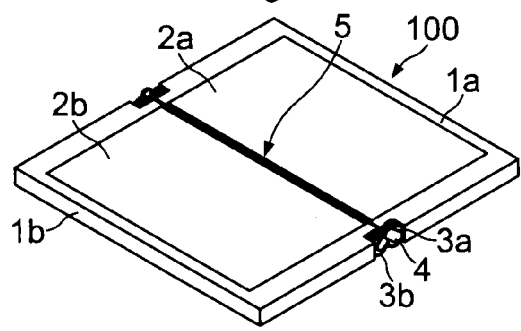

As shown in FIG. 3A, when the user lifts up the casing 1a in a state where the casings 1a and 1b are closed, for example, the gear members 3a and 3b and the coupling members 4 rotate to open the casing 1a as shown in FIGS. 3B to 3D. Accordingly, the touch panels 2a and 2b are exposed. Then, as shown in FIG. 3E, the casings 1a and 1b become static when opened 180 degrees so that the touch surfaces of the touch panels 2a and 2b and the touch sensor 5 are positioned on the same plane. The touch operation of the user is input in the state shown in FIG. 3E. By thus setting the touch surfaces on the same plane, it becomes possible for the user to perform intuitional operations without being bothered by the different touch panels and the touch sensor.

(Drag-and-Drop Operation of Portable Information Apparatus)

Figure 4:
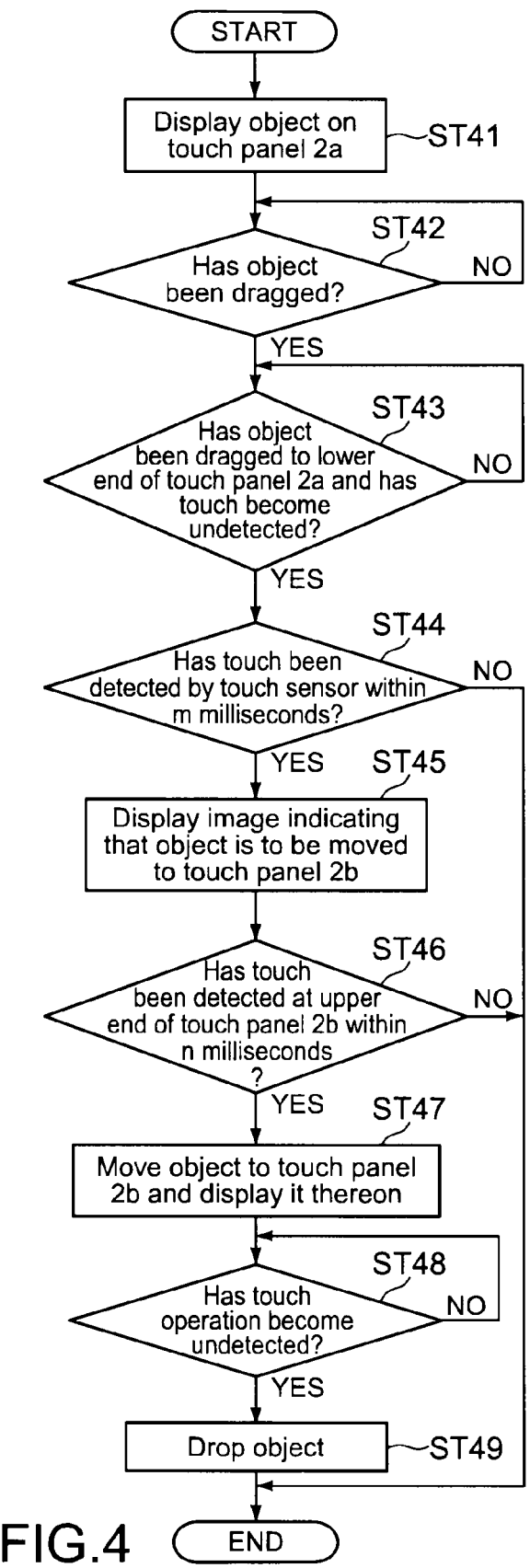
FIG. 4 is a flowchart showing a flow of processing of a drag-and-drop operation by the portable information apparatus according to the first embodiment of the present invention.

Next, a drag-and-drop operation executed by the touch panels 2a and 2b of the portable information apparatus 100 will be described. In descriptions below, the CPU 11 will be described as a subject of the operation, but the operation of the CPU 11 is executed in cooperation with programs developed in the RAM 12. FIG. 4 is a flowchart showing a flow of processing of the drag-and-drop operation by the portable information apparatus 100. FIG. 5 are diagrams showing an example of a state of the drag-and-drop operation by the portable information apparatus 100 seen from a direction of a plane of the touch panels 2a and 2b. Although a case where the user drags an object from the touch panel 2a to the touch panel 2b will be described in the figures, an operation in an opposite direction is of course executed in the same manner.

Figure 5A:
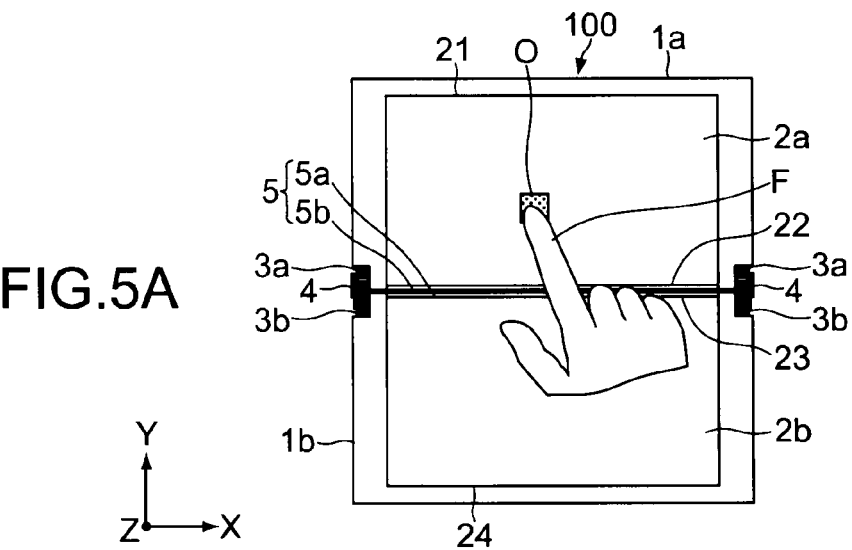
FIG. 5 are diagrams showing an example of a state of the drag-and-drop operation by the portable information apparatus according to the first embodiment of the present invention seen from a direction of a plane of a touch panel.

As shown in FIG. 4, the CPU 11 first displays an object O to be a target of a drag-and-drop operation by the user on the touch panel 2a (Step 41). Subsequently, the CPU 11 detects whether the object O has been dragged by a finger of the user (Step 42). FIG. 5A shows a state where the user is dragging the object O on the touch panel 2a.

When judging that the object O has been dragged (YES), the CPU 11 judges whether the object O has been dragged to a lower end (end side 22) of the touch panel 2a and the touch operation has become undetected (Step 43). Specifically, the CPU 11 judges whether, in a coordinate system having an origin at a left end of the end side 22 in FIGS. 5, a Y coordinate of touch detection coordinates has become 0.

When judging that the drag operation that has been detected has become undetected at the end side 22 (YES), the CPU 11 subsequently judges whether a touch operation has been detected by the touch sensor 5 within m milliseconds since a time point at which the drag operation has become undetected (hereinafter, referred to as t1) (Step 44). m is, for example, about 50 to 500, though not limited thereto. When judging that the touch operation to the touch sensor 5 has not been detected within m milliseconds (NO), the CPU 11 ends the processing.

Figure 5B:
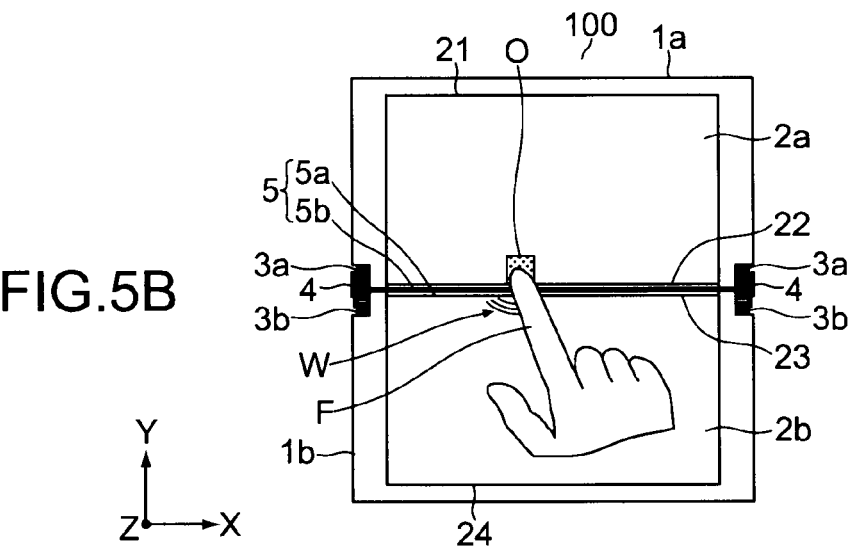

When judging that the touch operation to the touch sensor 5 has been detected within m milliseconds (YES), the CPU 11 displays on the touch panel 2b an image that indicates that the object O is to be moved (dragged) to the touch panel 2b (Step 45). FIG. 5B shows a state where the touch operation to the touch sensor 5 has been detected. As shown in FIG. 5B, the image may be, when the touch panels 2a and 2b are seen as a water surface, an animation like a ruffle on the water surface, for example. However, the image is not limited to that shown in the figure and may be any image as long as it indicates to the user that the object O is to be moved to the touch panel 2b. Accordingly, the user can grasp that the drag-and-drop operation from the touch panel 2a to the touch panel 2b is being executed for sure.

Subsequently, the CPU 11 judges whether a touch operation has been detected at an upper end (end side 23) of the touch panel 2b within n milliseconds since a time point at which the touch operation to the touch sensor 5 has been detected (hereinafter, referred to as t2) (Step 46). Specifically, the CPU 11 judges whether a maximum value of a Y coordinate in a coordinate system of the touch panel 2b having an origin at a left end of the end side 24 in FIG. 5 has been detected within n milliseconds. n is, for example, about 50 to 500, though not limited thereto. When judging in Step 46 that the touch operation to the touch panel 2b has not been detected within n milliseconds since t2 (NO), the CPU 11 ends the processing.

Figure 5C:
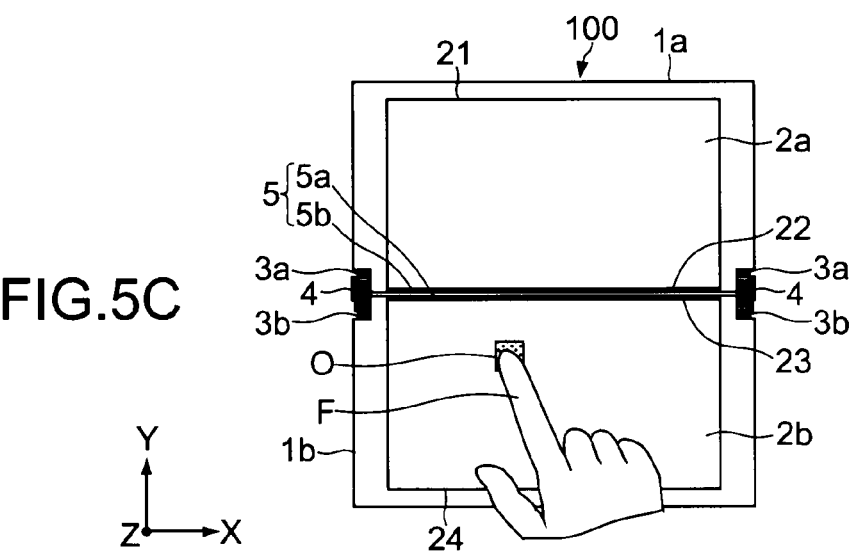

When judging that the touch operation to the touch panel 2b has been detected within n milliseconds since t2 (YES), the CPU 11 moves the object O from the touch panel 2a to the touch panel 2b to display it thereon (Step 47). FIG. 5C shows a state where the object O is moved to and displayed on the touch panel 2b.

After that, the CPU 11 judges whether the touch operation has become undetected on the touch panel 2b (Step 48). Then, when judging that the touch operation has become undetected (YES), the CPU 11 stops moving (drops) the object O at a position at that time point (Step 49).

As the image to be displayed in Step 45, the CPU 11 may alternatively display a part of the object O instead of the animation. FIG. 6 are diagrams showing a dragging state by the user in this case.

Figure 6A:
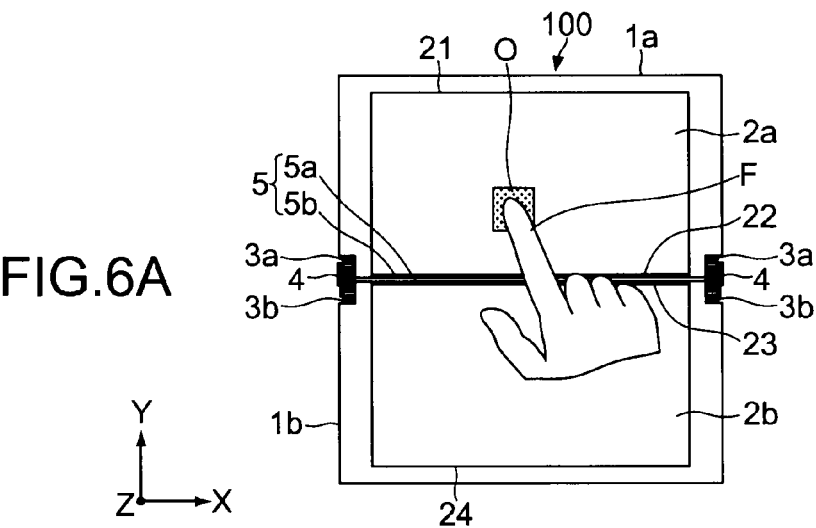
FIG. 6 are diagrams showing another example of a state of the drag-and-drop operation by the portable information apparatus according to the first embodiment of the present invention seen from the direction of the plane of the touch panel.
Figure 6B:
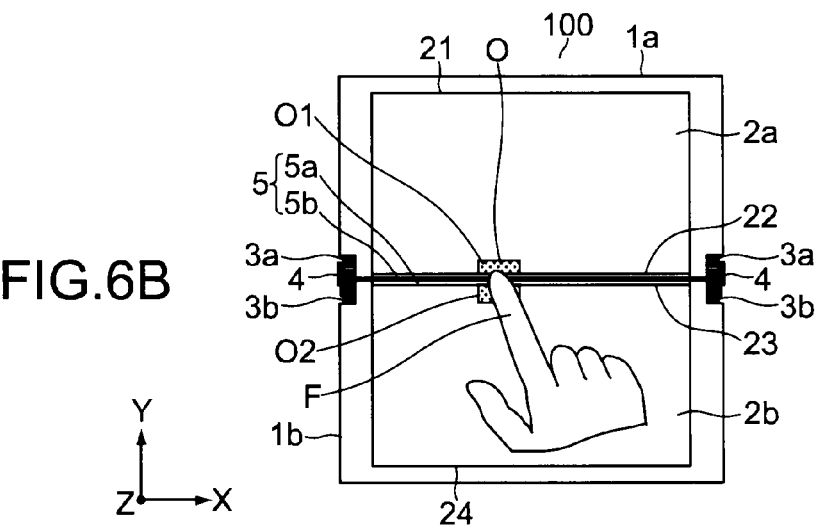
Figure 6C:
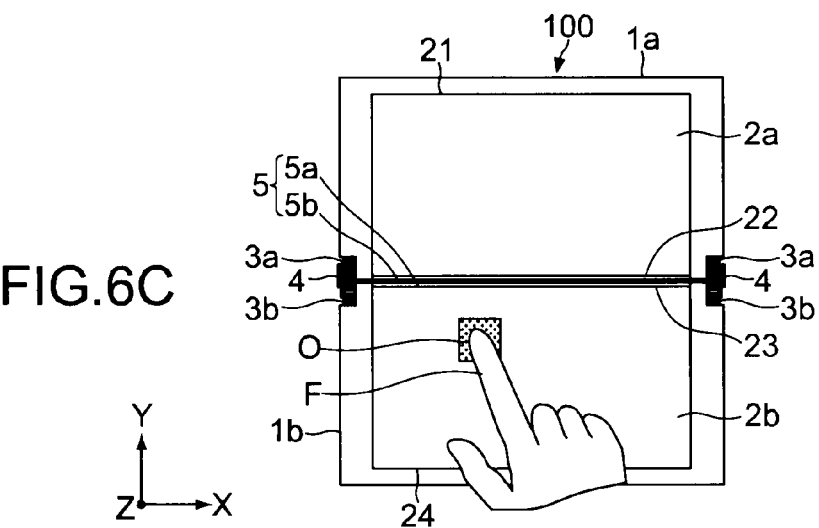

As shown in FIGS. 6A and 6B, when the touch operation to the touch sensor 5 is detected within m milliseconds since t1, the CPU 11 displays a partial upper portion O1 of the object O on the touch panel 2a and a partial lower portion O2 on the touch panel 2b. In other words, the partial lower portion O2 of the object O is displayed so as to stick out from the end side 23. As shown in FIG. 6C, processes after that are the same as those of FIG. 5. Also in this case, the user can grasp that the drag-and-drop operation from the touch panel 2a to the touch panel 2b is being executed for sure. In this case, the CPU 11 may alternatively display a part of the object O only on the touch panel 2b depending on an area of the object O.

(Specific Example of Drag-and-drop Operation)

The following operations can be exemplified as the drag-and-drop operation executed in this embodiment, though not limited thereto.

(1) An operation of moving an image (object) such as an icon displayed on the touch panel 2a (2b) and a window of an application that is being executed to the touch panel 2b (2a) and displaying it thereon (2) An operation of widely displaying, also on the touch panel 2b (2a), an image (object) such as a window of an application that is being executed on the touch panel 2a (2b)

(Application of Two Touch panels)

Various applications are conceivable for applications of the two touch panels 2a and 2b of this embodiment.

For example, the touch panel 2a (2b) may be used on a cloud side, and the touch panel 2b (2a) may be used on a client side.

An image downloaded from a computer of a cloud service provider on a network connected via the communication portion 14 is displayed on the cloud side, and an image of a file or the like stored in the portable information apparatus 100 is displayed on the client side. By drag-and-dropping an object from the cloud side to the client side, the user is capable of storing data corresponding to the object in the portable information apparatus 100 or updating data stored in the portable information apparatus 100. On the other hand, by drag-and-dropping an object from the client side to the cloud side, the user is capable of uploading data to a computer on the network or updating data in the computer.

As a specific example of such an application, there is a case of holding a Web meeting with a user of another client apparatus via a service provider. In this case, processing of exhibiting, by drag-and-dropping a window of a file displayed on the client side to the cloud side, the file to participants of the Web meeting may be executed. Also processing of setting a schedule of the user of the portable information apparatus 100 by drag-and-dropping an icon indicating a specific date on a calendar displayed on the cloud side to an area indicating the specific date on the calendar that is similarly displayed on the client side may be executed.

Alternatively, the touch panel 2a (2b) may be used on a remote side, and the touch panel 2b (2a) may be used on a local side.

A GUI for operating a file stored in another apparatus of the user on a LAN connected via the communication portion 14 is displayed on the remote side, and an image of a file or the like stored in the portable information apparatus 100 is displayed on the local side. By drag-and-dropping an object from the local side to the remote side, the user is capable of storing data of the portable information apparatus 100 in another apparatus or updating the data. On the other hand, by drag-and-dropping an object from the remote side to the local side, the user is capable of storing data of another apparatus in the portable information apparatus 100 or updating data in the portable information apparatus 100.

Furthermore, the two touch panels 2a and 2b may be used for tasks in multitasking.

In this case, the user can execute a plurality of tasks at the same time by drag-and-dropping an object alternately between the two touch panels 2a and 2b.

(Summary of First Embodiment)

As described heretofore, according to this embodiment, the portable information apparatus 100 counts, after the drag operation on the touch panel 2a is detected, a time period from a time the touch operation has become undetected at the end side 22 (t1) to a time a touch operation is detected by the touch sensor 5 (t2). Further, the portable information apparatus 100 counts a time period from t2 to a time the touch operation is detected by the touch panel 2b. Then, when the time periods are within m and n milliseconds, respectively, the portable information apparatus 100 moves the object O to the touch panel 2b and displays it thereon. In other words, the portable information apparatus 100 moves the object to the touch panel 2b to display it thereon when a touch operation to the touch panel 2b is detected within (m+n) milliseconds since t1.

Accordingly, the portable information apparatus 100 can positively execute the drag-and-drop operation of the object from the touch panel 2a to the touch panel 2b while preventing unintentional operations from being made.

<Second Embodiment>

Next, a second embodiment of the present invention will be described. In this embodiment, structures and functions that are the same as those of the first embodiment above are denoted by the same symbols, and descriptions thereof will be omitted or simplified.

(General Outline and Hardware Structure of Portable Information Apparatus)

Figure 7:
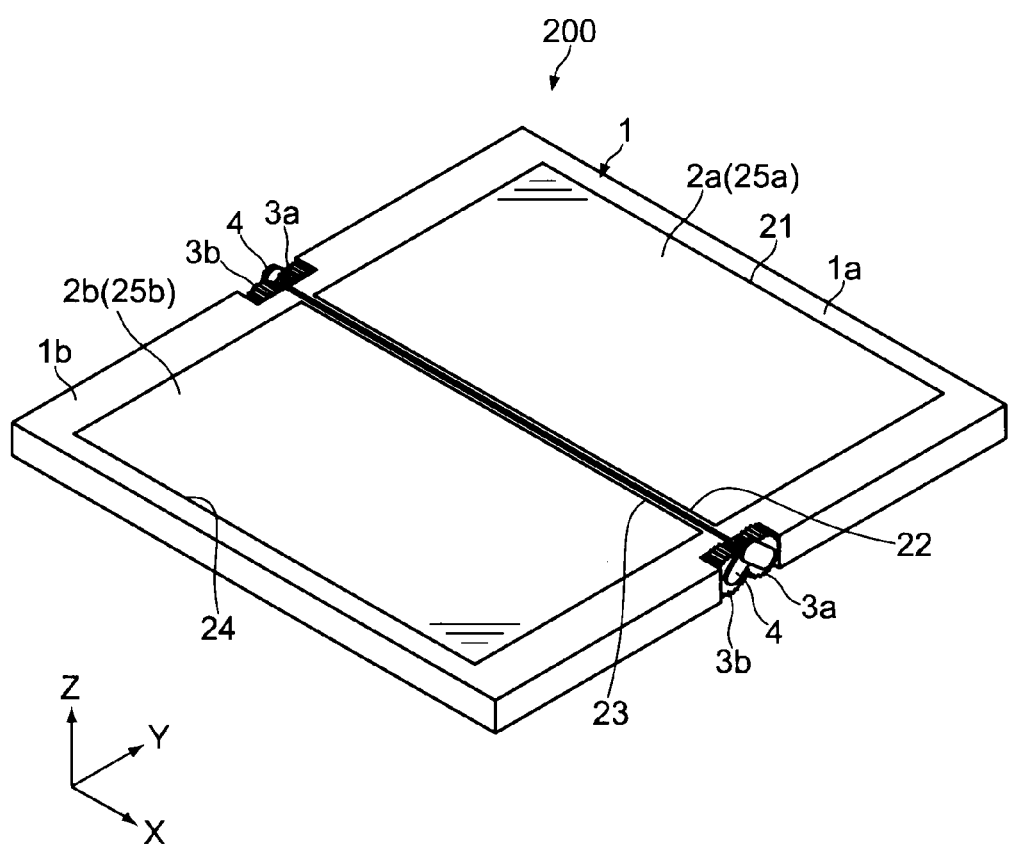
FIG. 7 is a diagram showing an outer appearance of a portable information apparatus according to a second embodiment of the present invention.
Figure 8:
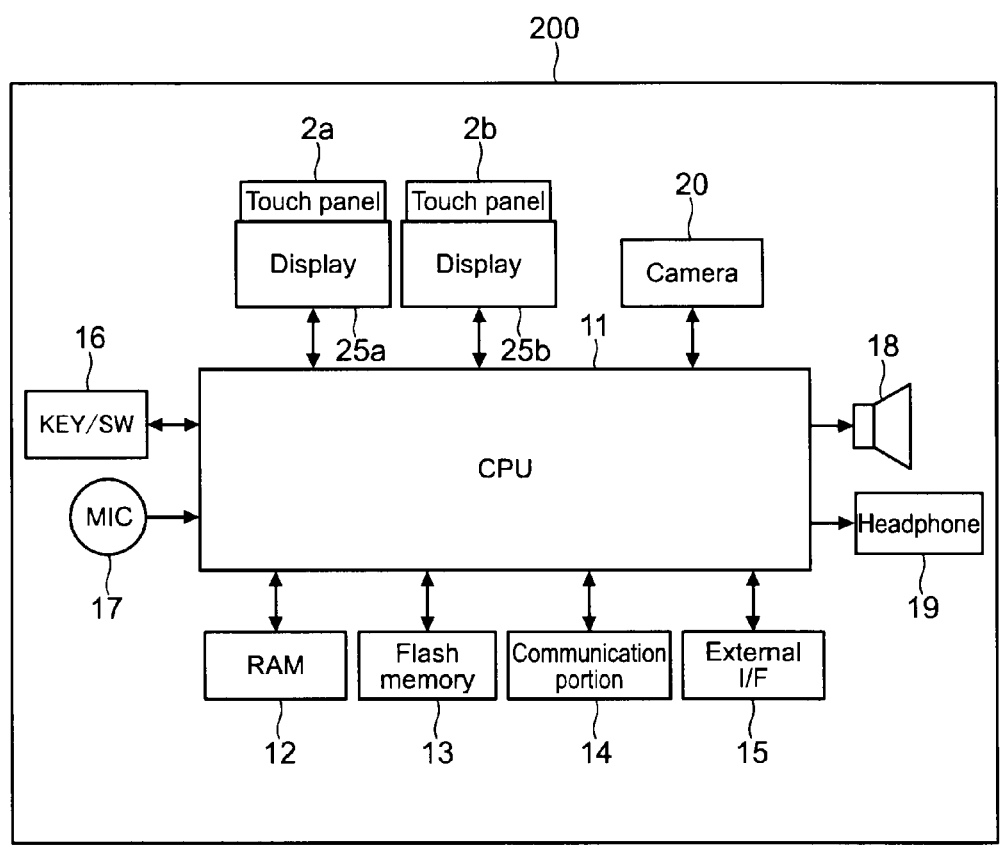
FIG. 8 is a diagram showing a hardware structure of the portable information apparatus according to the second embodiment of the present invention.

FIG. 7 is a diagram showing an outer appearance of a portable information apparatus of this embodiment. FIG. 8 is a diagram showing a hardware structure of the portable information apparatus of this embodiment.

As shown in the figures, a portable information apparatus 200 of this embodiment is different from the portable information apparatus 100 of the first embodiment in the point of excluding a touch sensor. Specifically, an area between the touch panels 2a and 2b is formed as parts of the casings 1a and 1b as shown in FIG. 7. Other structures of the portable information apparatus 200 are the same as those of the portable information apparatus 100.

(Operation of Portable Information Apparatus)

Figure 9:
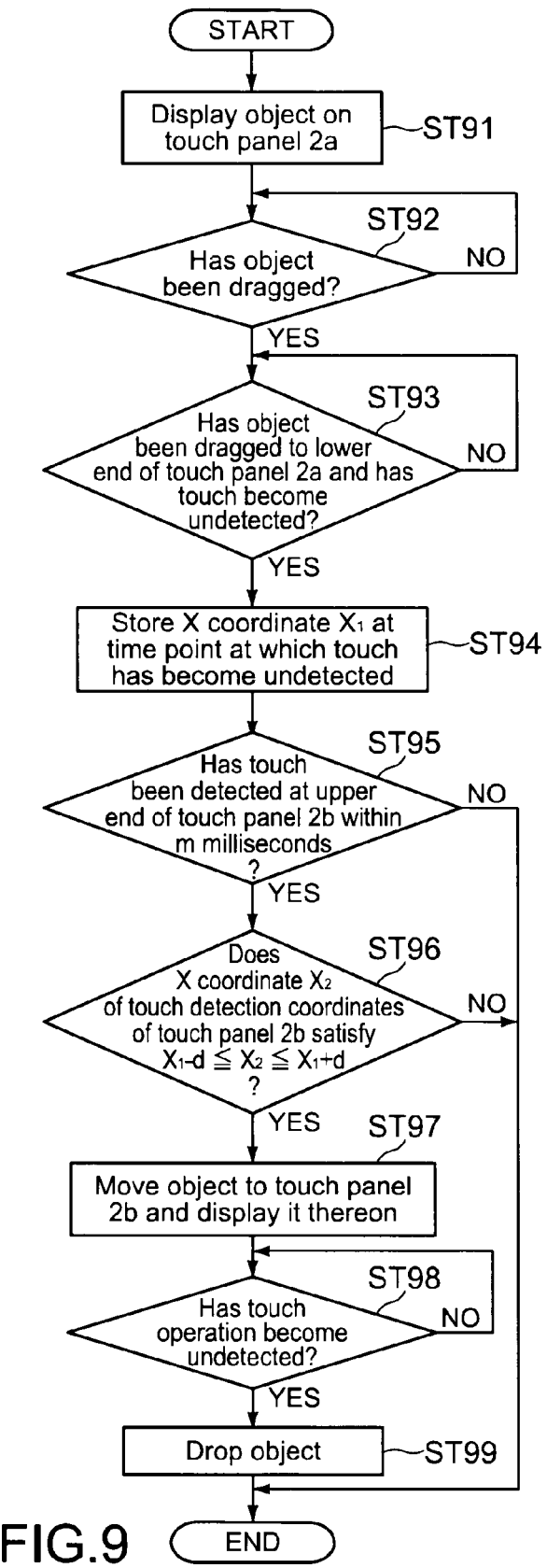
FIG. 9 is a flowchart showing a flow of processing of a drag-and-drop operation by the portable information apparatus according to the second embodiment of the present invention.

Next, an operation of the portable information apparatus 200 structured as described above will be described. FIG. 9 is a flowchart showing a flow of processing of a drag-and-drop operation by the portable information apparatus 200 of this embodiment. FIG. 10 are diagrams showing an example of a state of the drag-and-drop operation by the portable information apparatus 200 of this embodiment seen from a direction of a plane of the touch panels 2a and 2b.

As shown in FIG. 9, the CPU 11 first displays the object O to be the target of the drag-and-drop operation by the user on the touch panel 2a (Step 91). Subsequently, the CPU 11 detects whether the object O has been dragged by a finger of the user (Step 92). These operations are the same as those of the first embodiment.

When detecting that the object O has been dragged (YES), the CPU 11 subsequently judges whether the object O has been dragged to the end side 22 of the touch panel 2a and the touch operation has become undetected (Step 93). Specifically, the CPU 11 judges whether the Y coordinate of the touch detection coordinates in the coordinate system of the touch panel 2a that is the same as that of the first embodiment has become 0.

When judging that the drag operation that has been detected has become undetected at the end side 22 (YES), the CPU 11 stores an X coordinate $X_1$ at a time point at which the drag operation has become undetected (hereinafter, referred to as t1) in, for example, the RAM 12 or the flash memory 13 (Step 94). FIG. 10A shows this case.

Subsequently, the CPU 11 judges whether a touch operation has been detected at the upper end of the touch panel 2b within m milliseconds since t1 (Step 95). Specifically, the CPU 11 judges whether a maximum value of the Y coordinate has been detected within m milliseconds in the coordinate system of the touch panel 2b that is the same as that of the first embodiment. m is, for example, about 100 to 300, though not limited thereto. When judging in Step 95 that the touch operation has not been detected at the upper end of the touch panel 2b within m milliseconds (NO), the CPU 11 ends the processing.

When judging that the touch operation has been detected at the upper end of the touch panel 2b within m milliseconds since t1 (YES), the CPU 11 judges whether an X coordinate $X_2$ of the detection coordinates on the touch panel 2b and the stored X coordinate $X_1$ satisfy a relationship $X_{1-d} \leq X_2 \leq X_{1+d}$ (Step 96). Here, d is a predetermined distance and set as appropriate based on a distance between the end side 22 and the end side 23 in a Y direction in the figures, for example. In other words, d is set within a range that enables the operation to be judged as a natural drag operation from $X_1$ to $X_2$. When a difference between $X_1$ and $X_2$ is larger than d, it is judged that the operation made across the touch panels 2a and 2b is not a drag operation. For example, d is set so that an angle formed between a straight line connecting $X_1$ and $X_2$ and the end side 23 becomes 30° or more. When judging that d above does not satisfy the relationship (NO), the CPU 11 ends the processing.

When d satisfies the relationship, the CPU 11 moves the object O from the touch panel 2a to the touch panel 2b and displays it thereon (Step 97). At this time, the CPU 11 may first display the partial upper portion O1 of the object O on the touch panel 2a and the partial lower portion O2 on the touch panel 2b as shown in FIG. 10B and then move the entire object O to the touch panel 2b as shown in FIG. 10C. In other words, the object O may gradually show itself after the partial lower portion O2 thereof is first displayed so as to stick out from the end side 23. Accordingly, the user can grasp that the drag-and-drop operation is being executed for sure across the touch panels 2a and 2b.

After that, the CPU 11 judges whether the touch operation has become undetected on the touch panel 2b as in the first embodiment (Step 98). Then, when judging that the touch operation has become undetected (YES), the CPU 11 stops moving (drops) the object O at a position at that time point (Step 99).

(Summary of Second Embodiment)

As described heretofore, according to this embodiment, the portable information apparatus 200 counts the time period from the time point at which the touch operation has become undetected on the touch panel 2a (t1) to the time point at which the touch operation is detected on the touch panel 2b. The portable information apparatus 200 also detects a difference between the X coordinate $X_1$ at the time point t1 and the X coordinate $X_2$ at the time point at which the touch operation is detected on the touch panel 2b. Then, the portable information apparatus 200 moves the object O from the touch panel 2a to the touch panel 2b and displays it thereon when the detection time period is within m milliseconds and the difference between $X_1$ and $X_2$ is smaller than d.

Accordingly, even when the touch sensor 5 is not provided unlike the first embodiment, the portable information apparatus 200 can positively execute the drag-and-drop operation from the touch panel 2a to the touch panel 2b.

MODIFIED EXAMPLES

The present invention is not limited to the above embodiments and can be variously modified without departing from the gist of the present invention.

In the first embodiment above, the portable information apparatus 100 has displayed an image indicating a drag or the part O2 of the object O on the touch panel 2b when having detected the touch operation to the touch sensor 5. However, when the object O is dragged to an extent that it sticks out from the end side 22 of the touch panel 2a, the portable information apparatus 100 may display the image or the part of the object on the touch panel 2b irrespective of whether the touch operation to the touch sensor 5 has been detected.

In the second embodiment above, the portable information apparatus 200 has displayed the part O2 of the object O on the touch panel 2b when having detected the touch operation to the touch panel 2b. However, when the object O is dragged to an extent that it sticks out from the end side 22 of the touch panel 2a, the portable information apparatus 200 may display the part O2 of the object on the touch panel 2b even before detecting the touch operation to the touch panel 2b.

In the first embodiment above, the portable information apparatus 100 has moved the object to the touch panel 2b when detecting the touch operation to the touch panel 2b after detecting the touch operation to the touch sensor 5. However, when the touch operation to the touch panel 2b is detected within a predetermined time period since t1 above, the portable information apparatus 100 may move the object O to the touch panel 2b and display it thereon irrespective of whether the touch operation to the touch sensor 5 has been detected. The predetermined time period in this case is, for example, a time period shorter than m+n milliseconds described above.

Accordingly, the portable information apparatus 100 can positively execute the drag-and-drop operation even when a touch operation to the touch sensor 5 cannot be detected for some reason like too fast a movement of a finger of a user, for example.

In the above two embodiments, the portable information apparatuses 100 and 200 have moved the object O to the touch panel 2b and displayed it thereon when having detected the touch operation to the touch sensor 5 or the touch panel 2b. However, it is also possible for the portable information apparatuses 100 and 200 to move the object O to the touch panel 2b and display it thereon when a drag velocity detected on the touch panel 2a exceeds a predetermined value. Accordingly, the portable information apparatuses 100 and 200 can positively execute a so-called flick (throwing object O) operation.

Although the touch sensor 5 has not been provided in the portable information apparatus 200 in the second embodiment above, the portable information apparatus 200 may include the touch sensor 5. In this case, the portable information apparatus 200 only needs to execute the processing of the first embodiment shown in FIG. 4 in combination with the processing of the second embodiment shown in FIG. 9. In other words, the portable information apparatus 200 inserts the process of Step 94 of FIG. 9 between Steps 43 and 44 of FIG. 4 and executes it based on the processing shown in FIG. 4. On that basis, the portable information apparatus 200 only needs to execute the processes of Step 95 and the subsequent steps of FIG. 9 when it is judged in Step 44 of FIG. 4 that a touch has not been detected by the touch sensor 5 (NO).

By such processing, the portable information apparatus 200 can positively execute the drag-and-drop operation even when a touch cannot be detected by the touch sensor 5 for some reason.

The above two embodiments have shown the examples in which two touch panels 2a and 2b are provided in the portable information apparatuses 100 and 200. However, the number of touch panels is not limited to 2 as long as it is plural, and the same processing as that described above can be executed across the touch panels.

In the above two embodiments, the touch operations to the touch panels 2a and 2b have been input with a finger of the user. However, the touch operations may be input with a device such as a stylus pen.

Examples of the portable information apparatuses 100 and 200 to which the present invention can be applied in the above two embodiments include various information processing apparatuses such as a cellular phone, a PDA, a smartphone, a portable music/video player, an electronic dictionary, and an electronic organizer. Moreover, the present invention is not limited to a portable information apparatus and is similarly applicable to various stationary information processing apparatuses.

The present application contains subject matter related to that disclosed in Japanese Priority Patent Application JP 2009-097722 filed in the Japan Patent Office on Apr. 14, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An information processing apparatus, comprising:
a first touch panel to display an object and detect a first touch operation of a user on the object;
a second touch panel to detect a second touch operation of the user;
a touch sensor that is provided between the first touch panel and the second touch panel, the touch sensor detects a third touch operation of the user; and
a controller to move the object displayed on the first touch panel in accordance with the first touch operation, and display the object on the second touch panel when the third touch operation is detected within a first time period since the first touch operation has become undetected and the second touch operation is detected within a second time period since the third touch operation is detected.

2. The information processing apparatus according to claim 1,
wherein the controller displays, near the touch sensor, when the third touch operation is detected, an image indicating that the object is to be moved to the second touch panel.

3. The information processing apparatus according to claim 2,
wherein the first touch panel includes a first touch surface having a first end side and a second end side opposed to the first end side,
wherein the second touch panel includes a second touch surface having a third end side adjacent to the second end side with the touch sensor interposed therebetween and a fourth end side opposed to the third end side, and
wherein the controller displays, when the third touch operation is detected, the object such that a part of the object sticks out from the third end side of the second touch panel toward the second touch panel.

4. The information processing apparatus according to claim 1,
wherein the first touch panel includes a first touch surface to which the first touch operation is input,
wherein the second touch panel includes a second touch surface to which the second touch operation is input,
wherein the touch sensor includes a third touch surface to which the third touch operation is input, and
wherein the first touch surface, the second touch surface, and the third touch surface are provided so that the first touch surface, the second touch surface, and the third touch surface are positioned on the same plane at a time the first touch operation, the second touch operation, and the third touch operation are input.

5. The information processing apparatus according to claim 1,
wherein the controller detects a time period from a time the first touch operation is detected to a time the second touch operation is detected and displays, when the time period is a predetermined value or less, the object on the second touch panel irrespective of whether the third touch operation has been detected.

6. The information processing apparatus according to claim 1, wherein the first time period is a period of time ranging from 50 to 500 milliseconds.

7. The information processing apparatus according to claim 1, wherein the second time period is a period of time ranging from 50 to 500 milliseconds.

8. The information processing apparatus according to claim 1, wherein the first, second and third touch operations are part of a drag-and-drop operation.

9. An information processing method, comprising:
displaying, by a first touch panel, an object and detecting a first touch operation of a user on the object;
detecting, by a second touch panel, a second touch operation of the user;
detecting, by a touch sensor that is provided between the first touch panel and the second touch panel, a third touch operation of the user;
moving the object displayed on the first touch panel in accordance with the first touch operation; and
displaying the object on the second touch panel when the third touch operation is detected within a first time period since the first touch operation has become undetected and the second touch operation is detected within a second time period since the third touch operation is detected.

10. A non-transitory computer readable medium storing computer program instructions thereon, when executed by an information processing apparatus including a first touch panel, a second touch panel, and a touch sensor provided between the first touch panel and the second touch panel, which causes the information processing apparatus to execute the steps of:
displaying, by the first touch panel, an object and detecting a first touch operation of a user on the object;
detecting, by the second touch panel, a second touch operation of the user;
detecting, by the touch sensor, a third touch operation of the user;
moving the object displayed on the first touch panel in accordance with the first touch operation; and
displaying the object on the second touch panel when the third touch operation is detected within a first time period since the first touch operation has become undetected and the second touch operation is detected within a second time period since the third touch operation is detected.

* * * * *